United States Patent [19]

Ban et al.

[11] Patent Number: 5,450,050

[45] Date of Patent: Sep. 12, 1995

[54] MEANS OF FASTENING PERMANENT MAGNETS ON A MAGNET CARRIERS AND METHOD OF IMPLEMENTING SAME

[75] Inventors: Giorgio Ban, Gauting; Karel Pechaty, Starnberg; Doris Mohr, Penzberg; Georg N. Pürner, Braunschweig, all of Germany

[73] Assignee: Magnetbahn GmbH, Starnberg, Germany

[21] Appl. No.: 336,076

[22] Filed: Nov. 7, 1994

[30] Foreign Application Priority Data

Nov. 6, 1993 [DE] Germany .................. 43 37 934.6

[51] Int. Cl.⁶ .................. H01F 7/02; H02K 15/03; H02K 41/03
[52] U.S. Cl. .................. 335/306; 310/12; 104/286; 29/607
[58] Field of Search .................. 198/679, 690.1; 279/128; 269/8; 7/901; 81/20, 24; 29/607; 310/12, 13, 14; 335/295, 302, 306; 104/281–286

[56] References Cited

U.S. PATENT DOCUMENTS 5,225,725  7/1993  Shiraki et al. .................. 310/12

FOREIGN PATENT DOCUMENTS 0326088  8/1989  European Pat. Off. .
7328207  11/1973  Germany .
2263656  7/1974  Germany .

Primary Examiner—Leo P. Picard
Assistant Examiner—Raymond M. Barrera
Attorney, Agent, or Firm—Spencer, Frank & Schneider

[57] ABSTRACT

A permanent magnet assembly including a magnet carrier supporting a plurality of permanent magnets each having the shape of a top parallelepiped portion disposed on top of a bottom parallelepiped portion, with the top and bottom portions having equal lengths, but unequal widths, such that the bottom portion defines two identically dimensioned projections on each lengthwise side of the top portion. The magnets lie on the carrier with their bottom portions. To fasten the magnets to the carrier, holders are disposed on the two projections of the bottom portion and connected to the carrier to press the magnets onto the carrier. A single holder is disposed on two facing projections of two adjacent magnets, with the width of the holders determining the spacing between adjacent magnets and therefore the pole pitch of the magnet assembly. To fasten the magnets to the carrier, initially, a holder is loosely screwed onto the carrier, and thereafter a permanent magnet is placed on the carrier and pressed against the holder to engage one of its lengthwise projections, a further holder is loosely screwed to the carrier to engage the other lengthwise projection of the magnet, the screws of the immediately preceding holder are then tightened, a further magnet is then placed on the carrier and pushed against the further holder to engage one of its lengthwise projections, and so on until all magnets are fastened to the carrier.

14 Claims, 5 Drawing Sheets

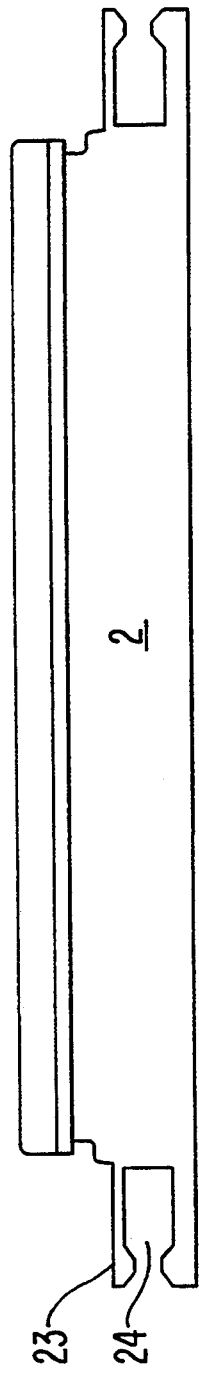
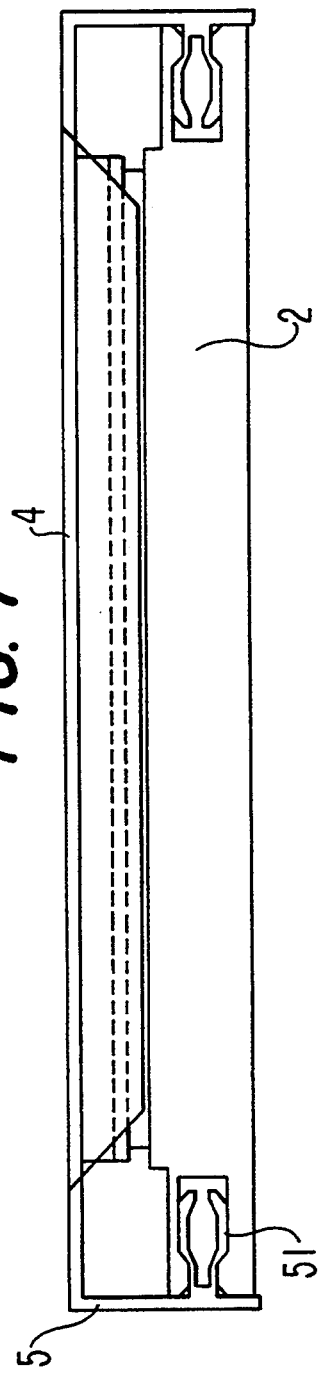

MEANS OF FASTENING PERMANENT MAGNETS ON A MAGNET CARRIERS AND METHOD OF IMPLEMENTING SAME

CROSS REFERENCE TO RELATED APPLICATION

This application claims the priority of German Patent Application Serial No. P 43 37 934.6 filed Nov. 6, 1993, the subject matter of which is incorporated herein by reference.

BACKGROUND OF THE INVENTION

The present invention relates to the fastening of permanent magnets on magnet carriers of vehicles having a linear motor.

According to the prior art, such fastening has been effected with glue. The disadvantage of gluing, however, is that it is very costly and difficult to implement because of the attraction of permanent magnets and magnet carriers to one another.

SUMMARY OF THE INVENTION

It is thus an object of the present invention to provide a simple and advantageous arrangement and method of fastening permanent magnets on magnet carriers.

The above object and many more to become apparent as the description of the invention progresses is satisfied by an embodiment of the invention according to which a permanent magnet assembly is provided which includes a magnet carrier supporting and having a plurality of permanent magnets mounted thereon. The permanent magnets each have the shape of a first parallelepiped disposed on top of a second parallelepiped, with the first and second parallelepipeds have equal lengths, but with the width of the second parallelepiped being greater than the width of the first parallelepiped, and thereby defining two identically dimensioned projections on each lengthwise side of the first parallelepiped. The permanent magnets lie on the magnet carrier on their second parallelepiped side. To fasten the permanent magnets to the magnet carrier, holders are disposed on the two projections of the second parallelepiped, and are secured to the magnet carrier to press the permanent magnets onto the magnet carrier. The holders are positioned such that their width determines the spacing between adjacent permanent magnets on the magnet carrier, and therefore the pole pitch, or distance between magnetic poles of the permanent magnet assembly.

According to a feature of the invention, each of the holders includes a thoroughgoing lengthwise groove which can accommodate the portion of a pole position winding of the permanent magnet assembly which extends between two adjacent magnets. A cover for each holder can also be provided in order to protect the portion of the pole position winding within the grooves, with these covers preferably being latched to the holders.

In addition, each of the holders preferably has a length such that it includes a support or lengthwise extension at each of its two ends for supporting parts of the pole position winding disposed along widthwise sides of the permanent magnets. Moreover, according to a preferred embodiment of the invention, cover strips are provided for covering the parts of the pole position winding extending along widthwise sides of the permanent magnets. These cover strips preferably are latched or fastened to the holders by snap closures which extend into receiving notches formed in the respective ends of the holders.

Finally, according to the preferred embodiment of the invention, an iron strip is inserted between each holder and the corresponding projections of the respective permanent magnets to cooperate with the holders in fastening the permanent magnets to the magnet carrier and to increase the magnetic flux.

The main object of the invention is further satisfied by a method of fastening permanent magnets in the permanent magnet assembly described above. According to a preferred embodiment of the method of the present invention comprises: (a) loosely screwing a holder onto the magnet carrier; (b) pressing a permanent magnet against the holder such that a portion of the holder lies above a corresponding first projection of the pressed permanent magnet; (c) loosely screwing a further holder to the magnet carrier such that a portion of the further holder lies above a corresponding second projection of the immediately preceding permanent magnet; (d) aligning the immediately preceding magnet if necessary; (e) tightening the screws of the immediately preceding holder; (f) pushing a further permanent magnet against the further holder such that a portion of the further holder lies above a corresponding first projection of the further permanent magnet; (g) loosely screwing a another holder onto the magnet carrier such that a portion of the another holder lies above a corresponding second projection of the further permanent magnet; and (h) repeating steps (d) through (g) until all permanent magnets are fastened to the magnet carrier.

The method of the present invention can further include the steps of positioning a pole position winding around the magnets and into lengthwise extending grooves of the holders after all permanent magnets have been fastened to the magnet carrier, and thereafter covering the pole position winding with holder covers and cover strips.

BRIEF DESCRIPTION OF THE DRAWINGS

Further features and details of the invention will become evident from the description below of embodiments thereof that are illustrated in the drawings, in which:

FIG. 6 is a side elevational view of the holder of FIG. 3; and

FIG. 7 is a side elevational view of the holder of FIG. 3 showing the holder cover and the winding cover strips assembled on the holder.

DETAILED DESCRIPTION OF THE INVENTION

Figure 1:
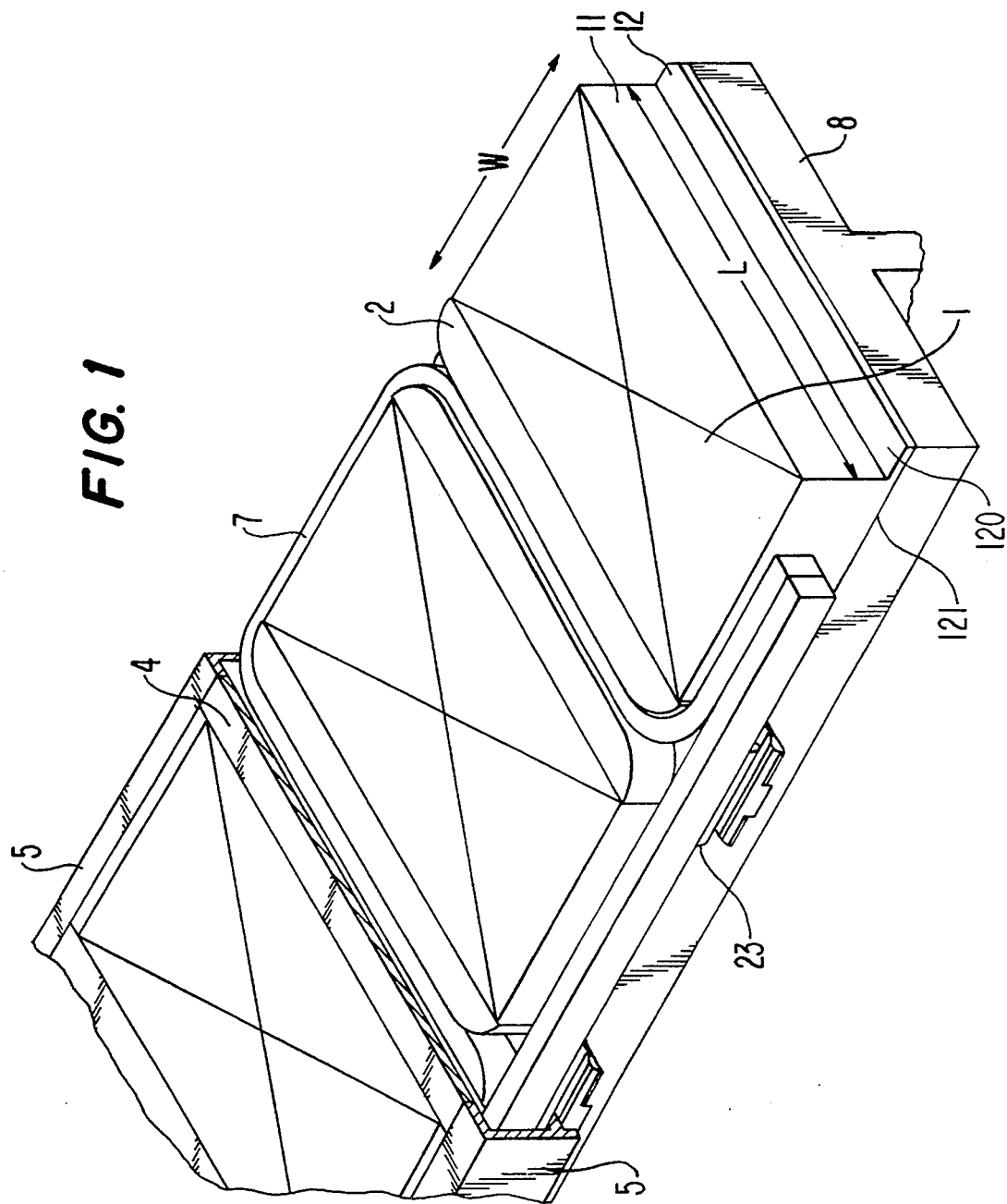
FIG. 1 is a top perspective view, partially cut away, of a permanent magnet assembly according to a preferred embodiment of the present invention.

Referring now to the Figures, overall, the permanent magnets 1 have the shape of two parallelepiped lying one on top of the other, with the top, higher parallelepiped 11 lying on top of the lower parallelepiped 12. As seen in FIG. 1, each of the top and bottom parallelepiped porions 11 and 12 has a length defined in a lengthwise direction designated by the letter L, and a width defined in a widthwise direction designated by the letter W. The top and bottom portions 11 and 12 are configured such that the length L of the bottom portion 12 is equal to that of the top portion 11. However, the width W of bottom portion 12 is greater than that of the top parallelepiped portion 11. The top portion 11 is symmetrically disposed on the bottom portion 11 so that the bottom portion 12 defines two identically dimensioned projections 120 on each lengthwise side of the top portion 11. The permanent magnets 1 lie on the magnet carrier 8 on their bottom portion side 121 and are pressed directly onto the magnet carrier 8 by the holders 2 which extend over the projections 120.

Figure 2:
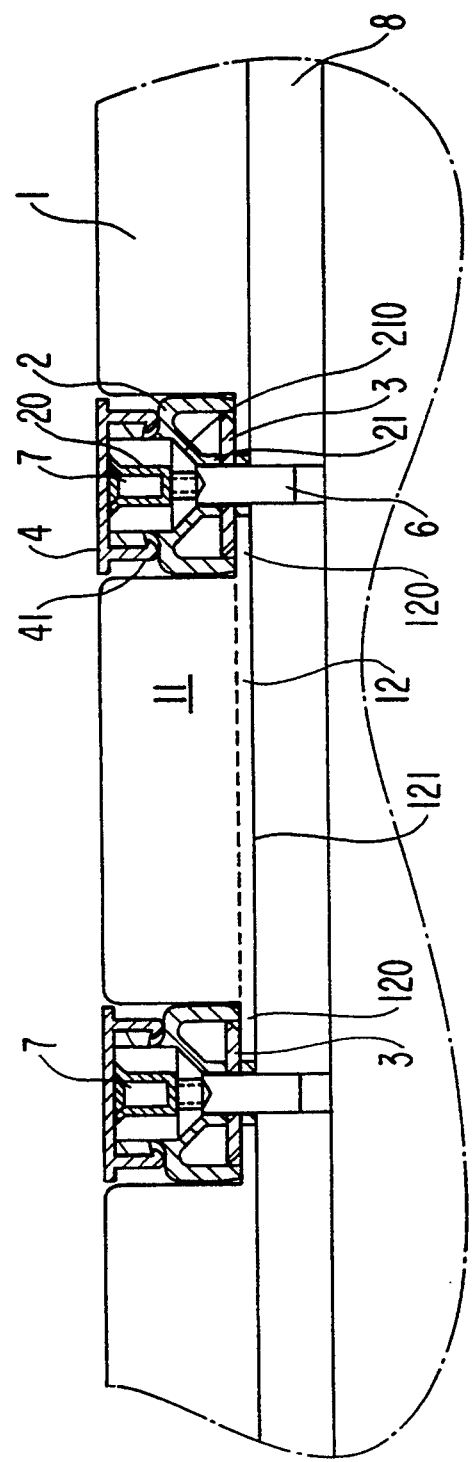
FIG. 2 is a longitudinal cross sectional view of the permanent magnet assembly of FIG. 1.
Figure 3:
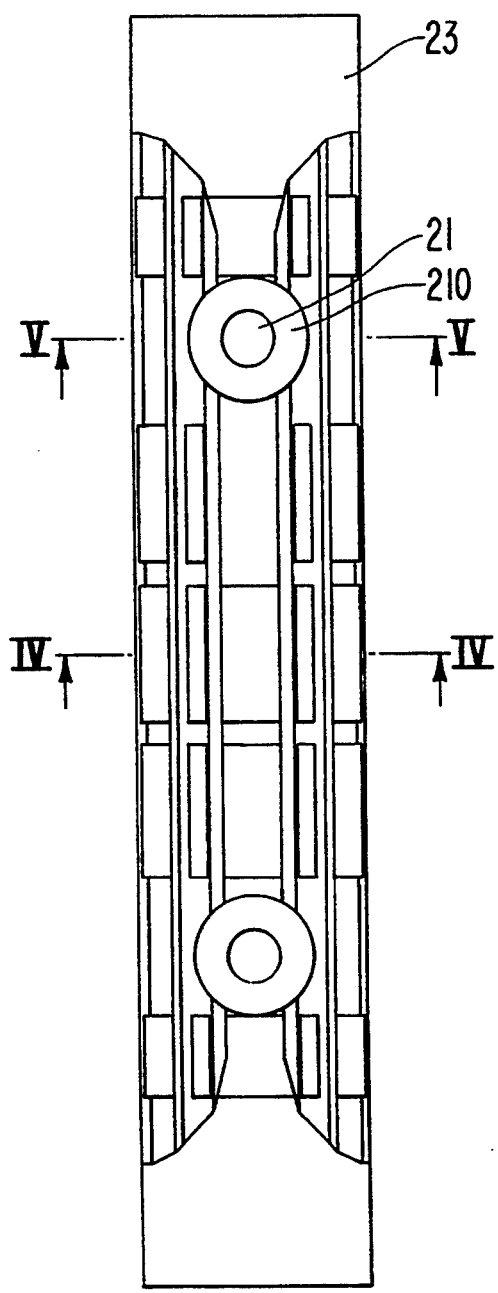
FIG. 3 is a top plan view of a holder in accordance with a preferred embodiment of the invention.
Figure 4:
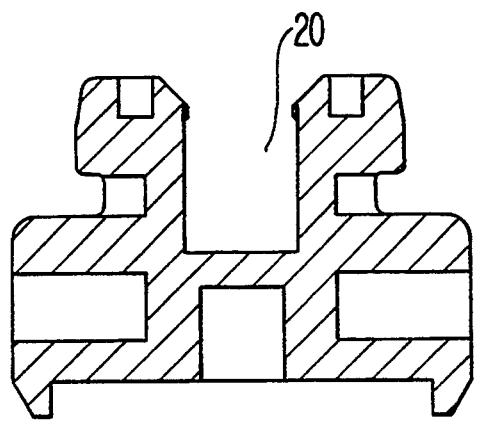
FIG. 4 is a view taken along section B—B of FIG. 3.
Figure 5:
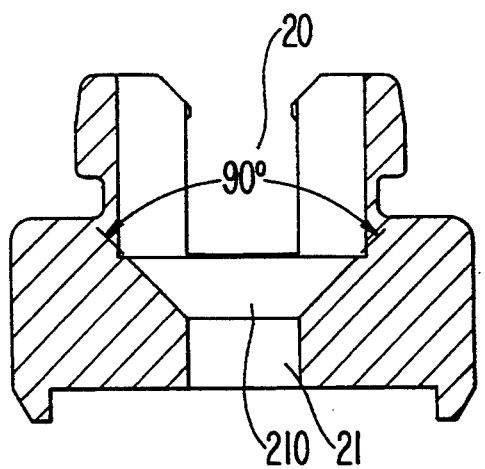
FIG. 5 is a view taken along section A—A of FIG. 3.

Preferably, as best seen in FIG. 2, a metallic iron strip 3 is directly disposed on the projections 12 of two adjacent magnets 1 and cooperates with the respective holder 2 in fastening the permanent magnets 1 to the magnet carrier 8 by increasing the stability of the holder 2 and improving the magnetic flux, and thus the efficiency of the linear motor. Metallic iron strips 3 preferably are as long as, and thus span the width of the magnet carrier 8 defined along direction L in FIG. 1. As best seen in FIGS. 2, 3, and 5, each holder 2 is connected to magnet carrier 8 by two screws 6 which are received within the two bores 21 of holder 2. Bores 21 include indentations 210 for accommodating the heads of the screws 6. Preferably, each holder 2 further includes a thoroughgoing lengthwise groove 20 in its upper surface for receiving and guiding a pole position winding 7 between adjacent one of the permanent magnets 1. Each holder 2 likewise has a lengthwise extending projection or support 23 located at each of its two ends for supporting the parts of the pole position winding 7 disposed along widthwise sides of the permanent magnets 1.

Each of the holders 2 is advantageously covered by a holder cover 4 such that the pole position winding 7 present in the respective thoroughgoing groove 20 is protected, as can be seen. In a particularly preferred embodiment of the invention, the covers 4 are provided with snap closures 41 for latching a holder cover 4 to a corresponding holder 2 as can be seen in FIG. 2. In a particularly preferred embodiment of the invention, the parts of the pole position winding 7 which extend laterally along lengthwise sides of the permanent magnets 1 are covered and protected by cover strips 5. In a particularly advantageous manner, these strips 5, which are generally L-shaped in cross-section (see FIG. 1 and 7) are provided with snap closures 51 which extend latched into respective receiving notches 24 integrated into the end surfaces of the holders 2 to latch the cover strips 5 to the holders 2.

Holder 2 therefore serves as a fastening means or mounting aid in the mounting of permanent magnets 1 onto magnet carrier 8. Moreover, the holders 2 serve as spacers between adjacent magnets 1 so that the width of the holders 2, defined in direction W shown in FIG. 1, determines the spacing between adjacent permanent magnets and thereby the pole pitch of the permanent magnet assembly. In a preferred embodiment of the invention, holder 2 guides and protects the pole position winding 7 in connection with the cover 4 and the strips 5. Holders 2, covers 4 and strips 5 are advantageously manufactured from a thermoplastic. Permanent magnets 1 advantageously comprise neodymium iron, which, because of its susceptibility to corrosion, is encased by a high-grade steel cover that is gently laser-welded.

The invention now being fully described, it will be apparent to one of ordinary skill in the art that any changes and modifications can be made thereto without departing from the spirit or scope of the invention as set forth herein.

What is claimed is:

1. A permanent magnet assembly including:
   a magnet carrier for supporting a plurality of permanent magnets;
   a plurality of permanent magnets each of which has a shape of a first parallelepiped on top of a second parallelepiped, with the first and second parallelepipeds each having equal lengths and different widths, with the width of the second parallelepiped being greater than the width of the first parallelepiped and defining two identically dimensioned lengthwise projections of the second parallelepiped on each lengthwise side of the first parallelepiped, said permanent magnets lying on said magnet carrier with their respective second parallelepipeds and with said projections of adjacent magnets facing one another; and
   holders disposed on said projections and screwed to the magnet carrier for pressing the permanent magnets onto the magnet carrier, said holders having a width corresponding to a desired spacing between adjacent said permanent magnets, and thus a pole pitch of the permanent magnet assembly.

2. The permanent magnet assembly according to claim 1 wherein each of the holders includes a lengthwise groove extending over its entire length for receiving and guiding a pole position winding.

3. The permanent magnet assembly according to claim 2 further including a respective cover for each said holder covering the respective groove to protect the pole position winding.

4. The permanent magnet assembly according to claim 2, further including a pole position winding disposed within said grooves along the lengths of said magnets and extending along the widthwise side of said magnets; and wherein each of said holders includes a support portion at each of its two ends which support the portions of the pole position winding disposed along the widthwise sides of the permanent magnets.

5. The permanent magnet assembly according to claim 4 further including cover strips covering said portions of said pole position winding.

6. The permanent magnet assembly according to claim 5, wherein: said holders include receiving notches in said support portions; and said cover strips include snap closures which fit into said receiving notches for fastening said cover strips to said holders.

7. The permanent magnet assembly according to claim 4 and further including an iron strip inserted between each said holder and associated said projections of respectively adjacent permanent magnets for cooperating with a respective said holder to fasten associated said permanent magnets to the magnet carrier.

8. The permanent magnet assembly according to claim 7 wherein said iron strip extends along the entire length of said projections.

9. The permanent magnet assembly according to claim 1 and further including an iron strip inserted between each said holder and associated said projections of respectively adjacent permanent magnets for cooperating with a respective said holder to fasten associated said permanent magnets to the magnet carrier.

10. The permanent magnet assembly according to claim 1, wherein the permanent magnets comprise neodymium iron encased in a high-grade steel casing which has been laser-welded.

11. The permanent magnet assembly according to claim 1, wherein said holders are made of a thermoplastic.

12. A method of fastening permanent magnets in a permanent magnet assembly according to claim 1 comprising:

(a) screwing a holder onto the magnet carrier without tightening its screws;

(b) pushing a permanent magnet against the holder such that a portion of the holder lies above a first lengthwise projection of the permanent magnet;

(c) screwing a further holder to the magnet carrier without tightening its screws and such that a portion of the further holder lies above a second lengthwise projection of the permanent magnet;

(d) tightening the screws of an immediately preceding holder;

(e) pushing a further permanent magnet against the further holder such that a portion of the further holder lies above a corresponding first lengthwise projection of the further permanent magnet;

(f) screwing another holder onto the magnet carrier without tightening its screws and such that a portion of the another holder lies above a corresponding second lengthwise projection of the subsequent permanent magnet; and (g) repeating steps (d) through (f) until all permanent magnets are fastened to the magnet carrier.

13. The method according to claim 12 further comprising aligning each magnet prior to tightening the screws of the associated immediately preceding holder.

14. The method according to claim 12 wherein the holders each have a longitudinally extending groove; and further comprising placing a pole position winding around the magnets and into the grooves of the holders after all permanent magnets have been fastened to the magnet carrier; and thereafter covering the pole position winding with covers fastened to the holders.

* * * * *